United States Patent [19]

Kramm et al.

[11] Patent Number: 4,995,463

[45] Date of Patent: Feb. 26, 1991

[54] METHOD FOR FRACTURING COAL SEAMS

[75] Inventors: Robert C. Kramm; Robert H. Lane, both of Plano, Tex.

[73] Assignee: Atlantic Richfield Company, Los Angeles, Calif.

[21] Appl. No.: 532,830

[22] Filed: Jun. 4, 1990

[51] Int. Cl.$^5$ .......................................... E21B 43/267
[52] U.S. Cl. .................................... 166/308; 166/309
[58] Field of Search ............... 166/259, 271, 280, 281, 166/308, 309; 299/12

[56] References Cited

U.S. PATENT DOCUMENTS

| | | | |
|---|---|---|---|
| 3,933,205 | 1/1976 | Kiel | 166/281 X |
| 4,391,327 | 7/1983 | DeCarlo | 166/308 X |
| 4,471,840 | 9/1984 | Lasseter et al. | 166/308 X |
| 4,619,776 | 10/1986 | Mondshine | 166/308 X |
| 4,645,514 | 2/1987 | Lane | 44/51 |
| 4,665,982 | 5/1987 | Brown | 166/308 X |
| 4,665,990 | 5/1987 | Perlman | 166/308 X |
| 4,679,630 | 7/1987 | Wyman | 166/308 X |
| 4,913,237 | 4/1990 | Kutas | 166/308 |

OTHER PUBLICATIONS

Jeffrey, R. G., et al., "Hydraulic Fracturing to Enhance Production of Methane from Coal Seams", Paper No. 8992, *Proceedings of the* 1989 *Coalbed Methane Symposium*, The University of Alabama/Tuscaloosa, Apr. 17–20, 1989.

*Primary Examiner*—George A. Suchfield
*Attorney, Agent, or Firm*—Drude Faulconer

[57] ABSTRACT

Method for fracturing coal seams to improve the production (e.g. methane and/or water) therefrom. A water-based fracturing fluid is injected into the coal seam under pressure wherein the fracturing fluid contains both a wetting agent and a dispersant. The wetting agent contacts the fines which are formed during the fracturing of the coal and converts them from "hydrophobic" to "hydrophilic" while the dispersant serves to disperse and suspend the fines within the fracturing fluid. This prevents early screen-out of the fines from the fracturing fluid which allows the fluid to propagate fractures of longer lengths into a coal seam before the fines settle out to block further flow through a fracture.

14 Claims, No Drawings

METHOD FOR FRACTURING COAL SEAMS

DESCRIPTION

1. Technical Field

The present invention relates to the fracturing of coal seams and in one of its preferred aspects relates to a method for fracturing a subterranean coal seam reservoir to improve the production of gas, e.g. methane, from the coal reservoir.

2. Background Art

Many subterranean coal seams have large volumes of both water and hydrocarbon gas (e.g. methane) or other gases trapped therein. Such reservoirs are water saturated with the methane being adsorbed onto the surface of the coal. This methane represents a valuable resource if it can be produced economically. Also, where a coalbed is to be mined later, it is beneficial from a safety standpoint to produce as much of this methane as possible before starting mining operations.

Presently, methane is produced from coal reservoirs through wells which are drilled into the coal seam from the surface. Once a well has been drilled and completed, the coal seam is usually hydraulically-fractured much in the same way as are more conventional sandstone or like oil and gas bearing formations. Fracturing of the coal seam is believed to aid in (a) bypassing wellbore damage; (b) distributing the pressure at or near the wellbore to alleviate the formation of coal fines; and (c) accelerating the dewatering and pressure drawdown in the coal seam, thereby leading to earlier gas production and ultimately higher gas production rates and increased reserves. However, the results from actual fracturing operations in coal formations indicate that the fracture mechanics and fluid flow behavior in the cleated, coal formations are substantially different from those which are believed to occur in the more conventional sandstone or like formations. For a good discussion of such differences and of various problems encountered in the fracturing of coal seams, see (1) "Analysis of Unconventional Behavior Observed During Coalbed Fracturing Treatments", Palmer et al, Paper 8993, and (2) "Hydraulic Fracturing to Enhance Production of Methane from Coal Seams", R. G. Jeffrey et al, Paper 8992, both presented at the Proceedings of the 1989 Coalbed Methane Syposium, The University of Alabama/Tuscaloosa, Apr. 17-20, 1989.

In a typical fracturing operation, a "pad" (i.e. volume of fracturing fluid without proppants) is first pumped down the well and into a formation under high pressure to initiate and propagate the fractures in the formation. The pad is followed with proppant-ladened slurry which forces the pad further into the formation thereby extending the fractures into the formation. As will be understood in the art, the proppants are deposited into the fractures as the ladened slurry flows therethrough to prop the fracture and prevent it from closing once the fracturing pressure is relieved. The pad, in addition to propagating the fracture, serves to replenish fluid to the proppant-ladened slurry as it is lost to the coal formation to thereby aid in preventing early or premature "screen-out" (i.e. the excessive settling and buildup of proppants caused by loss of fluid from the proppant-ladened slurry). This buildup of proppants forms a barrier, usually near the leading edge or tip of the fracture which eventually blocks the flow of fracturing fluid therethrough thereby preventing any further extension of the fracture into the formation.

Even though hydraulic-fracturing has been widely used to stimulate the production of methane from coal seams, it has not produced the degree of stimulation expected or desired. It is believed that one reason that it has failed to perform as expected is due to the large amounts of coal fines which are formed during the fracturing operation or subsequent production. These fines are picked up by the fracturing fluid and become more and more concentrated therein since (1) fines are continuously being formed by the breaking and abrasion of the coal and (2) liquid from the fracturing fluid is continuously being lost to the formation.

Coal fines are hydrophobic in that they do not "like" water and do not readily disperse in water or water-based solutions (e.g. fracturing fluid). Instead, they want to "float" on the fracturing fluid rather than forming a slurry therewith. Accordingly, the fracturing fluid picks up large volumes of fines which accumulate and quickly settle out of the fracturing fluid as it flows in the fracture. The coal fines carried by the fracturing fluid readily "screen-out" near the tip of the fracture and form a barrier which blocks further flow into the formation, thereby prematurely terminating the fracture before it would otherwise be terminated. Further, these fines are also likely to screen-out at other locations along the length of a fracture and form impermeable barriers at those locations which block both the flow of fracturing fluid during the fracturing operation and reverse flow through the fracture during production.

Therefore, it can be seen that if the coal fines can be better dispersed so that the fluid can carry higher concentrations of fines without settling, a fracture can be substantially extended into a coal seam and production (i.e. reverse flow) from the seam can be improved.

DISCLOSURE OF THE INVENTION

The present invention provides a method for fracturing coal seams to improve the production (e.g. methane and/or water) therefrom. The fracturing is carried out by injecting a water-based fracturing fluid into the coal seam under pressure wherein the fracturing fluid contains both a wetting agent and a dispersant. The wetting agent contacts the fines which are formed during the fracturing of the coal and converts them from "hydrophobic" to "hydrophilic" while the dispersant serves to disperse and suspend the fines within the fracturing fluid whereby large concentrations can be kept in suspension before the fines begin to settle in any substantial amounts. This prevents early screen-out of the fines from the fracturing fluid to thereby allow the fluid to propagate fractures of longer lengths into a coal seam before the fines settle out to block further flow through a fracture.

More specifically, a coal seam is fractured in accordance with the present invention by flowing a fracturing fluid down a well which has been completed into the coal seam and injecting the fluid into the seam under high pressure. The fracturing fluid is comprised of an aqueous or water-based solution formed by mixing a gelling agent (e.g. crosslinkable guar gel) with water. A wetting agent (e.g. polyalkyleneoxide nonionic surfactant having a hydrophilic portion comprising about 4 to 40 ethylene oxide units) and a dispersant (e.g. polyalkyleneoxide nonionic surfactant having a hydrophilic portion comprising about 40 to 150 ethylene oxide units) are blended and added to the water-based solution.

A pad of this fluid (i.e. no proppants) is injected into the coal seam to initiate and propagate fractures therein and is followed by proppant-ladened fluid to force the pad outward in the seam to propagate the fractures further. The wetting agent converts the coal fines to hydrophilic so that they are easily dispersed into the fluid where large volumes are suspended aided by the dispersant and are carried for further distances by the fluid in the fractures before the fines settle out to block flow.

In some instances, large amounts of coal fines can be removed before completing the fracturing operation by pre-treating a coal seam. A pad of the fracturing fluid (without proppants) is first injected into the coal seam to initiate and propagate fractures in the seam. After the pad is injected, the well is immediately opened and the pad and any formation fluids are produced therefrom. The pad picks up and suspends large volumes of coal fines which are formed during the injection of the pad and are produced therewith. After this pre-treatment, the fracturing of the coal seam is completed as described above.

BEST KNOWN MODE FOR CARRYING OUT THE INVENTION

In accordance with the present invention, a coal seam is fractured with a fracturing fluid which includes therein a "wetting agent" and a "dispersing agent or dispersant". As used herein, "wetting agent" shall mean an agent which is compatable with a water-based fracturing fluid and one which is capable of converting the fines produced in a coal seam from "hydrophobic" (i.e. do not readily wet in water) to hydrophilic (i.e. readily wet in water). "Dispersing agent or dispersant" shall mean an agent which aids in dispersing and suspending large concentrations of fines in a water-based fluid.

While a wide range of agents may serve as wetting agents and/or dispersants in carrying out the present invention, nonionic surfactants having a hydrophilic portion of different molecular weights are preferred. Generally, these surfactants consist of a hydrophobe to which is polymerized an average molar ratio of monomeric ethyleneoxide units. It is believed that species of these surfactants which have low to moderate molecular weights will adsorb to and aid in wetting the surfaces of the coal fines while the species of higher molecular weights will function to disperse and hold large concentrations of fines in a water-based slurry.

Although, polyalkyleneoxide nonionic surfactants are preferred as will be described in more detail below, ionic surfactants may also find some applications in the present invention, e.g. alkyl polyether ethoxylated sulfate, exthoxylated alcohol sulfate, alkyl aryl exthoxylated sulfate, alkyl aryl sulfonate types, and the like. Still other wetting agents and dispersing agents may be suggested to those skilled in the art which can be used in carrying out the present invention depending on the particular situation involved.

Suitable polyalkyleneoxide nonionic surfactants for use in fracturing fluids for coal seam application are commercially-available glycol ethers of the following general formula:

$$R-O-(CH_2CH_2O)_n-CH_2-CH_2-OH$$

wherein:

R is substituted or unsubstituted alkyl of from 1 to 18 carbon atoms, substituted or unsubstituted aryl, or an amino group and n is the number of ethylene oxide repeating units and varies from about 4 to about 150.

The preferred dispersant for use in the present invention is nonylphenoxy polyethyleneoxide having about 100 ethylene oxide units and the preferred wetting agent is comprised of nonylphenoxy polyethyleneoxide having a hydrophilic-lyophilic balance (HLB) of about 8 to 18; that is, having lower numbers of ethylene oxide units, e.g. 4 to about 40 (about 10). For a further and more detailed discussion of these surfactants which have been used to form coal slurries for fuel applications, see U.S. Pat. No. 4,645,514.

In fracturing a coal seam in accordance with the present invention, the exact composition of the fracturing fluid will vary depending on the particular application in which it is to be used. However, the following example is representative of a typical fracturing fluid used in the present invention.

A water-based solution of fracturing fluid is first formulated by mixing a commercially-available fracturing fluid agent (e.g. borate crosslinked guar gel) with fresh water and a bacteriacide (300 ppm). A wetting agent (e.g. nonylphenoxy polyethyleneoxide having about 10 ethylene oxide units) and a dispersant (e.g. nonylphenoxy polyethyleneoxide having about 100 ethylene units) are blended in a ratio of about 1 to 2 (e.g. 1 parts wetting agent to 2 part dispersant, by volume) and are added to the water-based fracturing fluid in a concentration of from about 3 to about 12 gallons of blended agents per 1000 gallons of fracturing fluid (e.g. 4 gals/1000 gals).

If a pad (fracturing fluid with no proppants) is to be used to initiate and propagate the fractures, approximately 30-40% of the fracturing fluid is pumped down the well and injected into the coal seam under high pressure (e.g. 1500 psi). As this fluid fractures the formation, it picks up the fines which are being formed by the fracturing operation. The wetting agent contacts the fines and converts them from hydrophobic to hydrophilic so that they easily disperse into the water-based fracturing fluid. The dispersant in the fluid acts to keep the fines dispersed and suspended therein thereby allowing the fluid to suspend relatively large concentrations of fines therein before any substantial amounts of the fines begin to settle. This reduces early screen-out of the fines and allows the fluid to flow further into the formation before the fines settle to block further flow thereby propagating fractures which have substantially greater lengths than those produced by known prior art coal fracturing operations of this type. For example, actual operations in accordance with the present invention have produced fractures in coal seams having a half-lengths of up to 850 feet and conductivities of 30 darcies-feet as compared to fractures having half-lengths of only 100 to 250 feet where the fracturing operations were carried out with prior known fracturing fluids.

After the pad is placed, proppants (e.g. sand of various meshes) are mixed into the remaining fracturing fluid in desired concentrations (e.g. from 1 to 12 pounds per gallon) in accordance with known fracturing procedures. This proppant-ladened fluid is then pumped down the well and into the coal seam and behind the pad to force the pad further into the formation to propagate the fracture therein. As will be understood, the proppants are deposited in the fractures as the fluid flows therethrough to prop the fractures open and prevent the fractures from closing when the fracturing pressure is relieved. Also, results from coal seams which have been fractured and propped in accordance with the present invention indicate that the use of a wetting agent and dispersant in the fracturing fluid allows the coal fines to flow back through the proppant pack during production rather than plug off the pack as is often the case in prior coal fracturing operations.

In a further embodiment of the present invention, a coal seam is pre-treated to remove large volumes of coal fines before completing the fractures with the fracturing steps described above. This pretreatment step comprises pumping down a pad of fracturing fluid (no proppants) having a wetting agent and dispersant, as described above, and initiating and propagating a fracture in the coal seam with this pad. Immediately at the end of the pump-in of the pad, the well is opened and the pad and formation fluids along with the coal fines are allowed to flow-back into the well.

Due to the wetting and dispersion capabilities of the fracturing fluid of the pad, large concentrations of fines (some as thick as one-half inch) are picked up and suspended in the fluid and carried back into the well by the fluid. Further, as the pad of fracturing fluid is pumped down the well and into the coal seam, gas, e.g. nitrogen, can be mixed under high pressure with the fracturing fluid to form a highly energized foam in the fractures as they are being formed in the coal seam. Upon flow-back, the pressurized gas increases the velocity of the produced fluid which substantially aids in keeping the fines suspended in the fluid as it is produced out of the fractures. Once the pre-treatment is completed, it may be followed with a pad and proppant-ladened fluid, as described above, to complete the fracture operation.

What is claimed is:

1. A method for fracturing a coal seam comprising:
   injecting a water-based fracturing fluid into said coal seam to initiate and propagate a fracture in the coal seam, said fracturing fluid comprising:
   a wetting agent for converting the coal fines which are formed during the fracturing of the coal seam from their natural hydrophobic state to a hydrophilic state; and
   a dispersant for dispersing said hydrophilic fines in said fracturing fluid.

2. The method of claim 1 wherein:
   said wetting agent comprises a surfactant having a hydrophilic portion comprising between about 4 and 40 ethylene oxide units; and
   said dispersant comprises a surfactant having a hydrophilic portion comprising between about 40 and 150 ethylene oxide units.

3. The method of claim 2 wherein said wetting agent and said dispersant comprise polyalkyleneoxide nonionic surfactants.

4. The method of claim 2 wherein said hydrophilic portion of said wetting agent comprises about 10 units of ethylene oxide and said hydrophilic portion of said dispersant comprises about 100 units of ethylene oxide.

5. The method of claim 1 wherein said fracturing fluid includes:
   proppants.

6. The method of claim 1 wherein said fracturing fluid is injected into said coal seam as a pad to initiate and propagate fractures in said coal seam and wherein said method includes:
   pumping a proppant-ladened fracturing fluid which includes proppants down the well and injecting said proppant-ladened fluid into said coal seam behind said pad to force said pad outward into the coal seam and to deposit said proppants in the fractures being formed.

7. The method of claim 6 wherein said proppant-ladened fracturing fluid comprises:
   a water-based solution of a fracturing agent;
   a wetting agent for converting the coal fines which are formed during the fracturing of the coal seam from their natural hydrophobic state to a hydrophilic state;
   a dispersant for dispersing said hydrophilic fines in said fracturing fluid; and
   proppants.

8. The method of claim 6 wherein:
   said wetting agent comprises a surfactant having a hydrophilic portion comprising between about 4 and 40 ethylene oxide units; and
   said dispersant comprises a surfactant having a hydrophilic portion comprising between about 40 and 150 ethylene oxide units.

9. The method of claim 8 wherein said hydrophilic portion of said wetting agent comprises about 10 units of ethylene oxide and said hydrophilic portion of said dispersant comprises about 100 units of ethylene oxide.

10. The method of claim 1 including:
    a pre-treatment step comprising:
    pumping said fracturing fluid down the well and injecting said fracturing fluid into said coal seam under high pressure to initiate and propagate fractures in said coal seam; and
    opening said well and producing back said fracturing fluid along with fluids and coal fines from said coal seam.

11. The method of claim 10 including:
    pumping a gas down the well to mix with said fracturing fluid within said coal seam to form a energized foam.

12. The method of claim 11 wherein said gas is nitrogen.

13. The method of claim 12 wherein said wetting agent and said dispersant comprise polyalkyleneoxide nonionic surfactants 14. The method of claim 13 wherein said fracturing agent comprises:
    a borate crosslinked guar gel.

* * * * *